United States Patent
Choi et al.

(10) Patent No.: US 9,477,086 B2
(45) Date of Patent: Oct. 25, 2016

(54) LIQUID CRYSTAL LENS AND DISPLAY DEVICE

(71) Applicant: Samsung Display Co., Ltd., Yongin, Gyeonggi-Do (KR)

(72) Inventors: Suk Choi, Seongnam-si (KR); Sung Hwan Hong, Suwon-si (KR); Su Jin Kim, Seoul (KR); Heung Shik Park, Seoul (KR); Ji Hong Bae, Yongin-si (KR); Hyeok Jin Lee, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 252 days.

(21) Appl. No.: 13/654,289

(22) Filed: Oct. 17, 2012

(65) Prior Publication Data
US 2013/0314649 A1    Nov. 28, 2013

(30) Foreign Application Priority Data
May 25, 2012    (KR) ......................... 10-2012-0055983

(51) Int. Cl.
| | |
|---|---|
| G02F 1/1335 | (2006.01) |
| G02B 27/22 | (2006.01) |
| G02F 1/137 | (2006.01) |
| G02B 3/08 | (2006.01) |
| H04N 13/04 | (2006.01) |

(52) U.S. Cl.
CPC ............. *G02B 27/2214* (2013.01); *G02B 3/08* (2013.01); *G02F 1/13718* (2013.01); *G02F 2203/28* (2013.01); *H04N 13/0404* (2013.01); *H04N 13/0415* (2013.01); *H04N 13/0447* (2013.01)

(58) Field of Classification Search
CPC ........................ G02B 27/2214; H04N 13/0435
USPC ...................................... 349/15, 95
See application file for complete search history.

(56) References Cited

U.S. PATENT DOCUMENTS

| | | | |
|---|---|---|---|
| 5,574,593 A | * | 11/1996 | Wakita ................ G02F 1/13363 349/163 |
| 5,699,184 A | | 12/1997 | Hall |
| 7,058,252 B2 | | 6/2006 | Woodgate et al. |

(Continued)

FOREIGN PATENT DOCUMENTS

| | | |
|---|---|---|
| JP | 2011-150344 | 8/2011 |
| JP | 2011-197640 | 10/2011 |

(Continued)

*Primary Examiner* — Paisley L Arendt
*Assistant Examiner* — Agnes Dobrowolski
(74) *Attorney, Agent, or Firm* — Innovation Counsel LLP

(57) ABSTRACT

A display device includes a first polarizer for transmitting first light that is parallel to a first axis and pertains to a two-dimensional image. The display device further includes a first electrode layer, a second electrode layer, and a liquid crystal layer disposed between the first electrode and the second electrode. The liquid crystal layer includes a chiral dopant and a liquid crystal material and is configured to form a lens associated with a predetermined phase distribution. The lens is configured for refracting the first light to transmit second light. The display device further includes a second polarizer for polarizing the second light to transmit third light that is parallel to a second axis. The second axis is oriented at an angle with respect to the first axis in a plan view of the display device. The angle has a predetermined angle size greater than zero degree.

20 Claims, 19 Drawing Sheets

(56) References Cited

U.S. PATENT DOCUMENTS

| | | |
|---|---|---|
| 7,532,272 B2 | 5/2009 | Woodgate et al. |
| 7,589,810 B2 | 9/2009 | Sugiyama |
| 2002/0135720 A1* | 9/2002 | Yamanaka et al. ........... 349/122 |
| 2007/0177096 A1* | 8/2007 | Uchida ............. G02F 1/133707 349/177 |
| 2007/0298194 A1* | 12/2007 | Fukagawa et al. .......... 428/1.33 |
| 2008/0094545 A1* | 4/2008 | Ko ......................... G02B 27/26 349/96 |
| 2010/0073768 A1 | 3/2010 | Kim |
| 2010/0097449 A1* | 4/2010 | Jeong ................ G02B 27/2214 348/59 |
| 2011/0157496 A1 | 6/2011 | Im |
| 2011/0157498 A1* | 6/2011 | Kim .................. G02F 1/134309 349/15 |
| 2013/0107174 A1 | 5/2013 | Yun et al. |

FOREIGN PATENT DOCUMENTS

| | | |
|---|---|---|
| KR | 10-2008-0057883 | 6/2008 |
| KR | 10-2009-0004006 | 1/2009 |
| KR | 10-2010-0137725 | 12/2010 |
| KR | 10-2011-0104701 | 9/2011 |
| KR | 10-2011-0107405 | 9/2011 |
| KR | 10-2011-0138585 | 12/2011 |
| KR | 10-2013-0046116 | 5/2013 |
| WO | 2011-036736 | 3/2011 |

* cited by examiner

LIQUID CRYSTAL LENS AND DISPLAY DEVICE

CROSS-REFERENCE TO RELATED APPLICATION

This application claims priority to and the benefit of Korean Patent Application No. 10-2012-0055983 filed in the Korean Intellectual Property Office on May 25, 2012, the entire contents of which are incorporated herein by reference.

BACKGROUND OF THE INVENTION (a) Field of the Invention

The present invention relates to a liquid crystal lens. The present invention also relates to a display device that includes a liquid crystal lens.

(b) Description of the Related Art

As display device technology advance, 3D (or three-dimensional) stereoscopic image display devices have been commercialized.

Stereoscopic images may be displayed using binocular disparity. In using binocular disparity, an image prepared for a left eye and an image prepared for a right eye are displayed in the same display device and are seen by the left eye and the right eye of a viewer. That is, images observed at different angles are seen by corresponding eyes to allow the viewer to perceive a 3D effect.

Binocular disparity may be implemented using a barrier and/or using a lenticular lens, which may include one or more cylindrical lenses.

A barrier used in a stereoscopic image display device may include a slit for separating an image from the display device into a left-eye image and a right-eye image to be seen by the left eye and the right eye, respectively, of the viewer.

A lenticular lens used in a stereoscopic image display device may divide an image from the stereoscopic image display device into a left-eye image and a right-eye image by changing one or more light paths.

For switching between displaying 2D (or two-dimensional) images and displaying 3D images, switchable lenses are developed.

The above information disclosed in this Background section is only for enhancement of understanding of the background of the invention. The Background section may contain information that does not form the prior art that is already known in this country to a person of ordinary skill in the art.

SUMMARY OF THE INVENTION

An embodiment of present invention is related to a liquid crystal lens mechanism that includes a chiral dopant mixed in a liquid crystal material. An embodiment of the invention is related to a display device that includes the aforementioned liquid crystal lens mechanism. The chiral dopant may effectively enhance the transmittance of the liquid crystal lens formed in the liquid crystal lens mechanism.

An embodiment of the invention is related to a display device that may include a first polarizer configured to transmit first light that is parallel to a first polarization axis, wherein the first light pertains to a two-dimensional image. The display device may further include a first electrode layer. The display device may further include a second electrode layer overlapping the first electrode layer. The display device may further include a liquid crystal layer disposed between the first electrode and the second electrode. The liquid crystal layer may include a chiral dopant and a liquid crystal material, wherein the chiral dopant may be mixed in the liquid crystal material. The liquid crystal layer may be configured to form a lens that is associated with a predetermined phase distribution according to voltages applied to the first electrode layer and the second electrode layer. The lens may be configured for refracting the first light to transmit second light. The display device may further include a second polarizer configured for polarizing the second light to transmit third light that is parallel to a second polarization axis. The second axis may be oriented at a first angle with respect to the first polarization axis in a plan view of the display device. The first angle may have a predetermined angle size that is greater than zero degree.

A pitch of the chiral dopant may be greater than 20 μm and may be less than about 60 μm.

The display device may further include a first alignment layer positioned on the first electrode layer and having an alignment direction parallel to the first polarization axis. The display device may further include a second alignment layer positioned on the second electrode layer and having an alignment direction oriented at a second angle that has the predetermined angle size with respect to the first polarization axis in the plan view of the display device.

The alignment direction of the first alignment layer and the alignment direction of the second alignment layer are reversely-twisted by the predetermined angle size in the plan view of the display device.

The display device may further include a plurality of pixels arranged in a plurality of rows and a plurality of columns. Each row of the plurality of rows may have a row width. Each column of the plurality of columns may have a column width. If θ represents the predetermined angle size, if n and m represent natural numbers, if a represents the column width, and if b represents the row width, then θ=tan$^{-1}$ (ma/nb).

The predetermined angle size is less than 90 degrees.

A lens axis of the lens formed by the liquid crystal layer is parallel to the second polarization axis.

The lens formed by the liquid crystal layer is configured to change a path of the first light according to an optical principle of a Fresnel zone plate.

One of the first electrode layer and the second electrode layer may include a first electrode array including a first plurality of electrodes, a second electrode array including a second plurality of electrodes, and an insulating layer disposed between and the first electrode array and the second electrode array. One of the first electrode layer and the second electrode layer may include a common electrode.

Each electrode of the first plurality of electrodes or each electrode of the second plurality of electrodes extends in a direction that is parallel to the second polarization axis.

A ratio of a width of the first electrode or the second electrode to a cell gap of the liquid crystal layer is equal to or more than 1.0 and is equal to or less than 2.0.

In a three-dimensional image display mode of the display device, a voltage is applied to at least one of the first electrode layer and the second electrode layer; in a two-dimensional image display mode of the display device, the voltage is turned off.

An embodiment of the invention is related to a liquid crystal lens mechanism. The liquid crystal lens mechanism may include a first electrode layer. The liquid crystal lens mechanism may further include a first alignment layer overlapping the first electrode layer and configured for aligning a first set of liquid crystal molecules in a first direction. The liquid crystal lens mechanism may further include a second electrode layer overlapping the first electrode layer. The liquid crystal lens mechanism may further include a second alignment layer overlapping the second electrode layer and configured for aligning a second set of liquid crystal molecules in a second direction that is at a first angle having a predetermined angle size with respect to the first direction in a plan view of the liquid crystal lens mechanism, wherein the predetermined angle size is greater than zero degree. The liquid crystal lens mechanism may further include a liquid crystal layer disposed between the first alignment layer and the second alignment layer. The liquid crystal layer may include the first set of liquid crystal molecules, the second set of liquid crystal molecules, and a chiral dopant. The liquid crystal lens mechanism may further include a polarizer overlapping the second electrode having a polarization axis that is oriented at a second angle with respect to the first direction in the plan view of the liquid crystal lens mechanism, wherein the second angle has the predetermined angle size.

A pitch of the chiral dopant may be more than 20 μm and may be less than 60 μm.

An alignment direction of the first alignment layer and an alignment direction of the second alignment layer may be reversely-twisted by the predetermined angle size.

The predetermined the angle size may be less than 90 degrees.

A lens axis of a liquid crystal lens formed by the liquid crystal layer may be parallel to the polarization axis.

A liquid crystal lens formed by the liquid crystal layer may be configured to a path of light according to an optical principle of a Fresnel zone plate.

One of the first electrode layer and the second electrode layer may include a first electrode array including a first plurality of electrodes, a second electrode array including a second plurality of electrodes, and an insulating layer disposed between the first electrode array and the second electrode array. One of the first electrode layer and the second electrode layer may include a common electrode.

Each electrode of the first plurality of electrodes or each electrode of the second plurality of electrodes may extend in a direction that is parallel to the polarization axis.

According to one or more embodiments of the present invention, a chiral dopant is mixed in the liquid crystal of a liquid crystal lens, and the pitch of the chiral dopant is optimized. Advantageously, the transmittance and/or the response speed of the liquid crystal lens may be optimized.

DETAILED DESCRIPTION OF THE EMBODIMENTS

Figure 1:
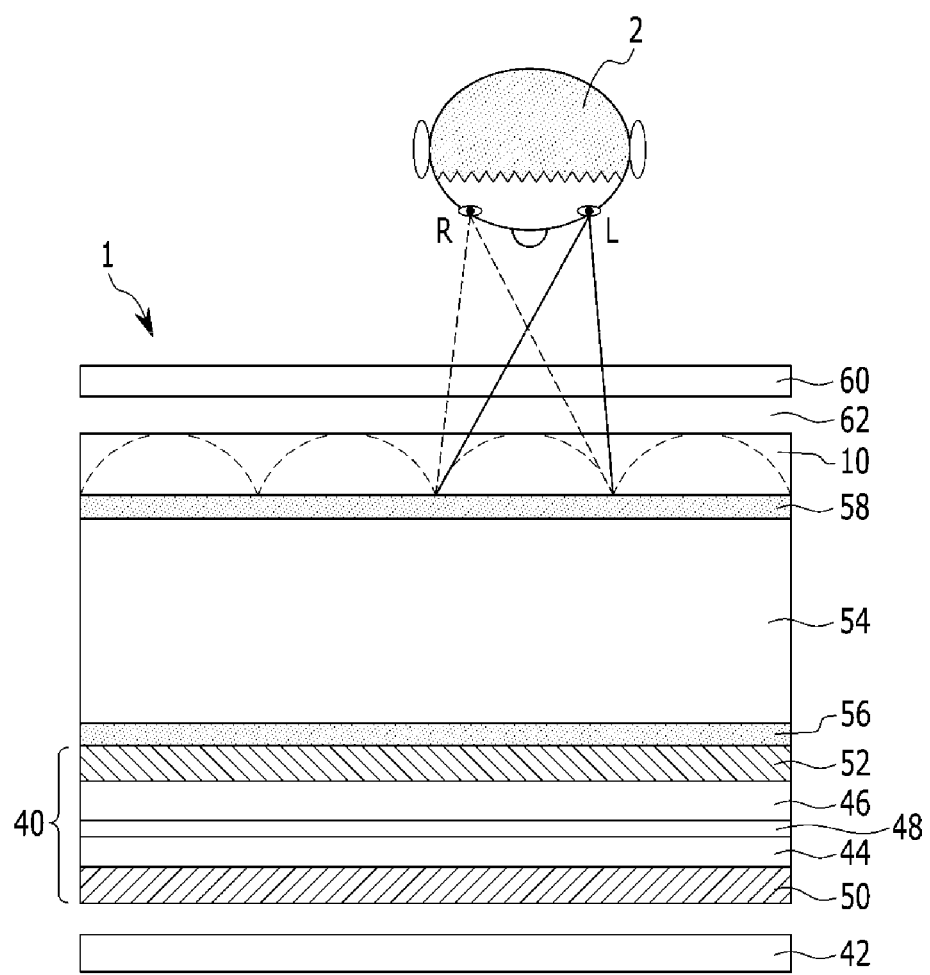
FIG. 1 illustrates a cross-sectional view of a display device capable of performing 2D/3D display conversion according to an embodiment of the present invention.

The present invention will be described more fully hereinafter with reference to the accompanying drawings, in which embodiments of the invention are illustrated. Embodiments described herein are provided to thoroughly and completely explain the disclosed contents and to sufficiently transfer the ideas of the present invention to a person of ordinary skill in the art. The present invention is not limited to the embodiments described herein and may be embodied in other forms.

In the drawings, the thicknesses of layers and regions may be exaggerated for clarity. It is to be noted that when a first layer is referred to as being "on" a second layer (e.g., a substrate), it can be directly formed on the second layer or can be formed on the second layer with a third layer interposed between the first layer and the second layer. Like constituent elements may be denoted by like reference numerals throughout the specification.

FIG. 1 illustrates a cross-sectional view of a display device 1 capable of performing 2D/3D display conversion according to an embodiment of the present invention. Referring to FIG. 1, a 2D/3D switchable display device 1 includes a 2D liquid crystal display panel 40 and a liquid crystal lens 10 positioned on and/or overlapping the display panel 40. The liquid crystal lens 10 may be positioned between the display panel 40 and a user 2 of the display device 1. Alternative or in addition to the 2D liquid crystal display panel 40, one or more of other display panels, such as a cathode ray tube (CRT) display panel, a plasma display panel (PDP), an organic light-emitting diode (OLED) display panel, and an field emission display (FED) panel, may be included in the display device 1.

The 2D display panel 40 may provide a 2D image through a polarizer in a direction parallel to a first polarization axis. The 2D liquid crystal display panel 40 includes pixels arranged in a matrix having rows and columns. The liquid crystal display panel 40 includes transparent substrates 44 and 46 that are separated and are disposed substantially in parallel. A liquid crystal layer 48 is interposed between the substrates 44 and 46. Thin film transistor (TFTs) corresponding to the pixels are formed on the front surface (or an inner surface) of the substrate 44. Gates and sources of the TFTs are respectively connected to gate lines and data lines related to the corresponding rows and the corresponding columns, and drains of the TFTs are connected to pixel electrodes. A color filter and a black matrix may be formed on the entire front surface of the substrate 44.

Polarizers 50 and 52 are attached on the outer surfaces of the substrate 44 and the substrate 46, respectively. Light irradiated from a backlight unit (BLU) 42 is polarized by the polarizer 42, transmitted through the liquid crystal display panel 40, polarized by the polarizer 52, and the transmitted polarized light is incident to the liquid crystal lens 10. In one or more embodiments, the polarizer 52 may have a polarization axis that is parallel to the first polarization axis. In one or more embodiments, the polarizer 50 may generally have a polarization axis that is perpendicular to the first polarization axis.

The liquid crystal lens 10 is separated from the image display panel 40 to obtain a lens focal distance. In one or more embodiments, a gap spacing layer is positioned between the liquid crystal lens 10 and the image display panel 40.

The gap spacing layer may be a gap spacing plate 54 formed of transparent glass or plastic. The gap spacing plate 54 is formed with a sufficient thickness such that the lens focal distance may be maintained between lens units formed in the liquid crystal lens 10 and the pixels of the 2D liquid crystal display panel 40.

A first surface of the gap spacing plate 54 is adhered to the 2D liquid crystal display panel 40 by an optical adhesive 56, and a second surface of the gap spacing plate 54 is adhered to the lower surface of the liquid crystal lens 10 by an optical adhesive 58. The optical adhesives 56 and 58 are made of one or more optically transparent materials such that the refractive index of at least one of the optical adhesives 56 and 58 is not substantially different from one or more of the refractive indexes of the image display panel 40, the gap spacing substrate 54, and the liquid crystal lens 10. In one or more embodiments, the refractive indices of the optical adhesive 56, the optical adhesive 58, the image display panel 40, the gap spacing substrate 54, and the liquid crystal lens 10 are substantially equal.

A cover glass plate 60 configured to protect the liquid crystal lens 10 may be positioned on and/or may overlap the liquid crystal lens 10. The cover glass plate 60 may be formed with tempered glass.

An air gap 62 equal to or more than 5 mm may be formed between the liquid crystal lens 10 and the cover glass substrate 60.

Figure 2:
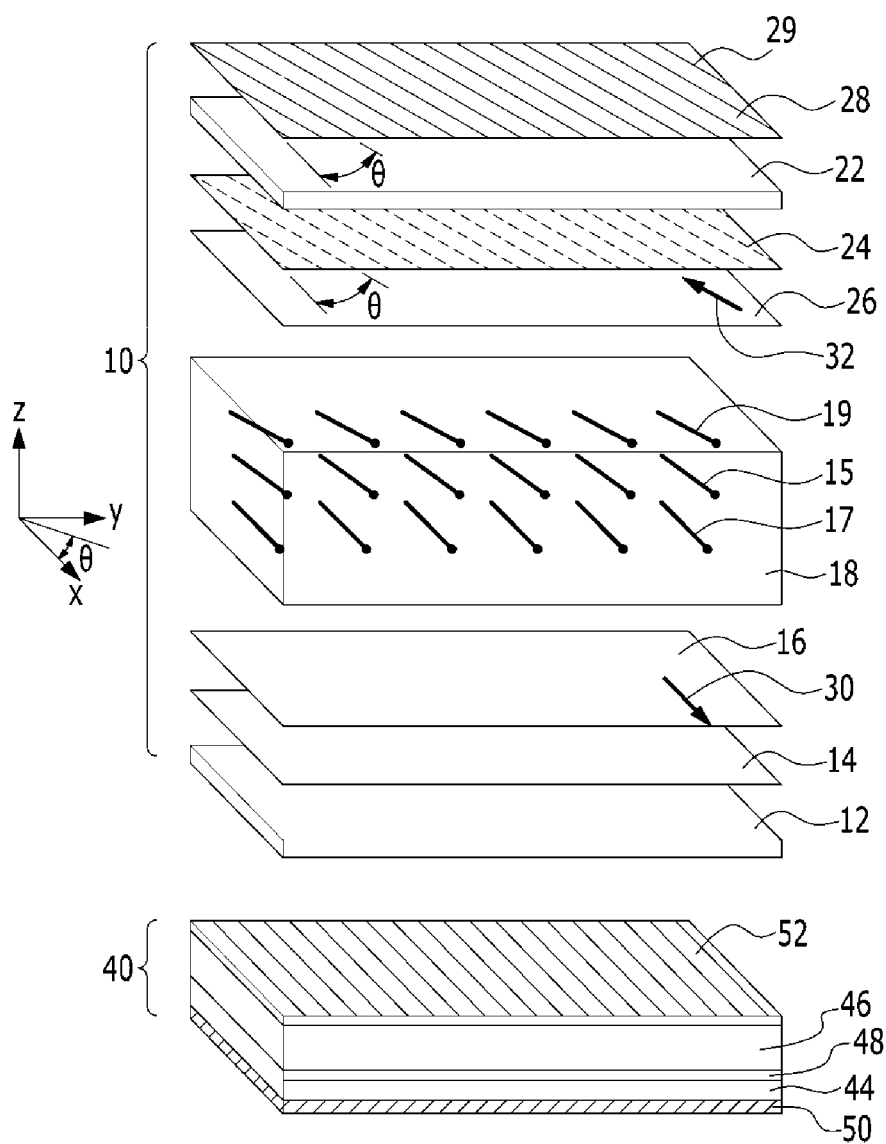
FIG. 2 illustrates an exploded perspective view of a liquid crystal lens according to an embodiment of the present invention.

FIG. 2 illustrates an exploded perspective view of the liquid crystal lens 10 included in the 2D/3D switchable display device 1 illustrated in FIG. 1 according to an embodiment of the present invention.

Referring to FIG. 2, the liquid crystal lens 10 includes a first substrate 12, a second substrate 22, a liquid crystal layer 18 positioned between the first substrate 12 and the second substrate 22, and a polarizer 28 disposed on the second substrate 22. The second substrate may be disposed between the liquid crystal layer 18 and the polarizer 28.

The first substrate 12 is a plate formed of transparent glass or plastic. A first electrode layer 14 is formed on the first substrate 12 and is formed between the first substrate 12 and the liquid crystal layer 18. The first electrode layer 14 may be a common electrode formed by depositing a transparent material such as ITO (indium tin oxide) or IZO (indium zinc oxide) on an entire surface of the first substrate 12.

A first alignment layer 16 is formed on the first electrode layer 14 and formed between the first electrode 14 and the liquid crystal layer 18. The first alignment layer 16 is configured to align liquid crystal molecules to (or substantially parallel to) a first alignment direction 30, such that the liquid crystal molecules are aligned parallel to the direction of the polarization axis of the polarizer 52 (which is positioned between the first alignment layer 16 and the liquid crystal layer 48).

A second electrode layer 24 is disposed on the second substrate 22 and is disposed between the second substrate 22 and the liquid crystal layer 18. A second alignment layer 26 is disposed between the second electrode layer 24 and the liquid crystal layer 18. The second substrate 22 is a plate that may be formed of similar or the same transparent glass or plastic material as the first substrate 12. The second electrode layer 24 has stripe electrodes extending at an angle θ (which is greater than 0 degree) with respect to an x-axis direction illustrated in FIG. 2 or with respect to the first alignment direction 30 in a plan view of the liquid crystal lens 10. These electrodes may be formed by patterning a transparent conductive layer made of ITO or IZO using a well-known photolithography technique. The second alignment layer 26 may be configured to align liquid crystal molecules to (or substantially parallel to) a second alignment direction 32 that is the same as (or substantially parallel to) the extending direction of the stripe electrodes. The second alignment direction 32 may be at the angle θ with respect to the x-axis direction or with respect to the first alignment direction 30 in a plan view of the liquid crystal lens 10.

The polarizer 28 is positioned on the front surface of the second substrate 22 such that the second substrate 22 is disposed between the polarizer 28 and at least one of the second electrode layer 24, the second alignment layer 26, and the liquid crystal layer 18. A polarization axis 29 of the polarizer 28 is substantially parallel to the extending direction of the stripe electrodes formed on the second electrode layer 24. Therefore, the polarization axis 29, the extending direction of the stripe electrodes, and the second alignment direction 32 of the second alignment layer 26 may be parallel to each other.

The liquid crystal layer 18 is positioned between the first alignment layer 16 and the second alignment layer 26. The liquid crystal layer 18 may include a liquid crystal material that includes a chiral dopant. Liquid crystal molecules adjacent to the first alignment layer 16 are pretilted in the first alignment direction 30, and liquid crystal molecules near the second alignment layer 26 are pretilted in the second direction 32. It is preferable that the chiral dopant included in the liquid crystal material has a pitch of larger than about 20 μm and less than about 60 μm to improve the transmittance. The transmittance may be improved because the chiral dopant is twisted by a fringe field to generate a wave guiding effect. If the chiral dopant has a pitch of 20 μm or less, transmittance distortion may appear. In addition, since the transmittance improvement effect may be less than 1% if the pitch is larger than 50 μm, it may be preferable that the pitch of the chiral dopant added to the liquid crystal material is equal to or more than 30 μm and is equal to or less than 50 μm.

For determining the alignment direction of the liquid crystal molecules, one or more of a rubbing technique implemented according to a characteristic of an alignment material, a light alignment technique using an inclined ion beam or ultraviolet (UV) rays, and a voltage application technique may be used. For example, in implementing the rubbing method (or technique), a polyimide layer is coated on a substrate and is pre-baked, heating is performed to remove a solvent in the polyimide layer, the polyimide layer is baked, and a polymer material is formed by acetylation to form the alignment layer, and then the substrate formed with the alignment layer is moved in the direction opposite to a rotation direction of a roller including rayon (and therefore is rubbed) to determine the alignment direction. According to an embodiment of the present invention, to align the liquid crystal molecules adjacent to the first alignment layer 16, when using the rubbing method, the first alignment layer 16 is formed on the first substrate 12, and then the first alignment layer 16 is rubbed in the first direction 30 to determine the alignment of the liquid crystal molecules.

Using the same or a similar rubbing method, the alignment direction of the liquid crystal molecules adjacent to the second alignment layer 26 formed on the second substrate 22 is realized by rubbing the second alignment layer 26 in the second direction 32. This alignment of the liquid crystal molecules may be realized by filling the liquid crystal between the first and second alignment layers 16 and 26 after rubbing the alignment layer 16 and 26.

Alternative to or in addition to the rubbing method, a light alignment method and/or an electric field application method may be used according to the characteristics of the alignment layer. For example, the alignment direction of the alignment layer that includes an organic-inorganic polysiloxane layer combined with pretilt functional groups may be implemented using inclined UV and/or inclined irradiation of an ion beam.

Figure 3A:
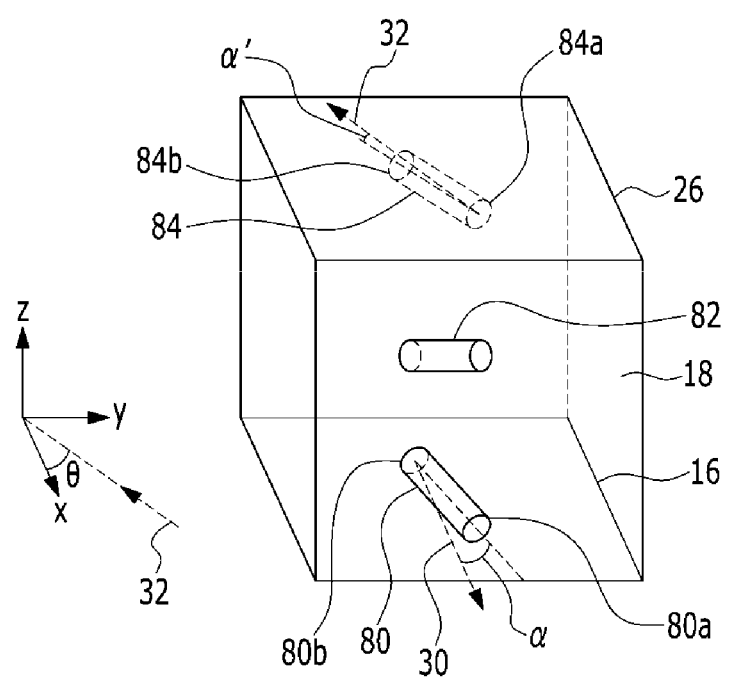
FIG. 3A and FIG. 3B are schematic representations that illustrate positions of liquid crystal molecules with respect to a light transmission direction.

FIG. 3A is a schematic representation that illustrates positions of liquid crystal molecules of the liquid crystal layer 18 with respect to a light transmission direction (a z-axis direction). For facilitating description and understanding, liquid crystal molecules 80, 82, and 84 among the liquid crystal molecules are illustrated as examples.

The liquid crystal molecule 80 represents a molecule pretilted and aligned on (or near) the first alignment layer 16, the liquid crystal molecule 82 (disposed between the liquid crystal molecule 80 and the liquid crystal molecule 84) represents a molecule disposed at (or near) the center of the liquid crystal layer 18 (along the z-axis direction), and the liquid crystal molecule 84 represents a molecule pretilted and aligned on (or near) the second alignment layer 26.

One end 80b of the long axis of the liquid crystal molecule 80 contacts the first alignment layer 16 and the other end 80a of the long axis of the liquid crystal molecule 80 does not contact the first alignment layer 16 such that the long axis of the liquid crystal molecule 80 is pretilted with the pretilt angle α in a range of about 2-7 degrees with respect to the first alignment layer 16 and with respect to the x-axis direction, that is, the polarization axis direction of the polarizer 52 or the first direction 30. On the other hand, one end 84a of the long axis of the liquid crystal molecule 84 contacts the second alignment layer 26, and the other end 84b of the long axis of the liquid crystal molecule 84 does not contact the second alignment layer 26 such that the long axis of the liquid crystal molecule 84 is pretilted with the pretilt angle α' in a range of about 2-7 degrees with respect to the second alignment layer 26 and with respect to the direction of the polarization axis 29 of the polarizer 28, that is, the second direction 32 or the extending direction of the stripe electrodes of the second electrode layer.

In addition, the arrangement of the liquid crystal molecules 80, 82, and 84 is twisted with respect to the light transmission direction (the z-axis direction). That is, the alignment directions of the liquid crystal molecules 80 and 84 have form an angle θ in a plan view of the liquid crystal layer 18 viewed in the z-axis direction. The inclination angle θ is an angle between the second direction 32 or the straight line in which the long axis of the liquid crystal molecule 84 is orthographically projected to the plane of the second alignment layer 26 (or to the plane of the first alignment layer 16) and the first direction 30 or the straight line in which the long axis of the first liquid crystal molecule 80 is orthographically projected to the plane of the second alignment layer 26 (or to the plane of the first alignment layer 16). That is, the inclination angle (or twist angle) θ is the angle between the orthographic projection straight lines of the long axis of the liquid crystal molecule 80 and the liquid crystal molecule 84 onto a plane parallel to the alignment layers 16 and 26.

Figure 3B:
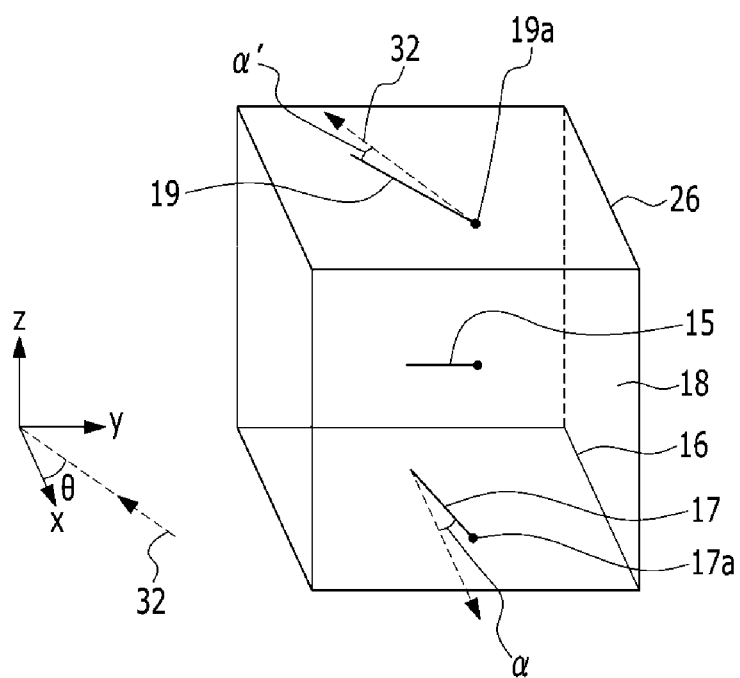

FIG. 3B is a schematic representation that illustrates directors instead of the liquid crystal molecules illustrated in FIG. 3A. For facilitating description, the directors instead of the liquid crystal molecules are illustrated. A director may be defined to represent the direction of the long axis of a liquid crystal molecule. Points 17a and 19a of the directors represent portions of liquid crystal molecules (e.g., portions 80a and 84a of the liquid crystal molecules 80 and 84) that are closer to the eyes of an image viewer (e.g., the user 2) than other portions of the respective liquid crystal molecules (e.g., portions 80b and 84b of the liquid crystal molecules 80 and 84). In FIG. 3B, directors 17, 15, and 19 correspond to the liquid crystal molecules 80, 82, and 84 illustrated in FIG. 3A. In FIG. 2, the directors 17, 15, and 19 represent alignment directions of liquid crystal molecules.

Next, a method for predetermining the inclination angle (or twist angle) θ will be described. To display a 3D image, a plurality of viewing points of the viewer are provided in the row direction of the pixels; as a result, it is more important to prevent the display quality deterioration in the horizontal direction rather than the display quality deterioration in the vertical direction. Therefore, it is required to improve the display quality deterioration due to color separation and moiré in the horizontal direction. The inclination angle (or twist angle) θ is defined as an angle between a lens axis of the lenticular lenses and the subpixel columns of the 2D display panel 40 in a plan view of the display device 1, that is, the angle between the lens axis of the semi-cylindrical lenses and the column direction of the pixels in the plan view of the display device 1. The inclination angle θ may be equal to the inclination angle (or twist angle) θ discussed with reference to the examples of FIG. 3A and FIG. 3B.

Figure 4A:
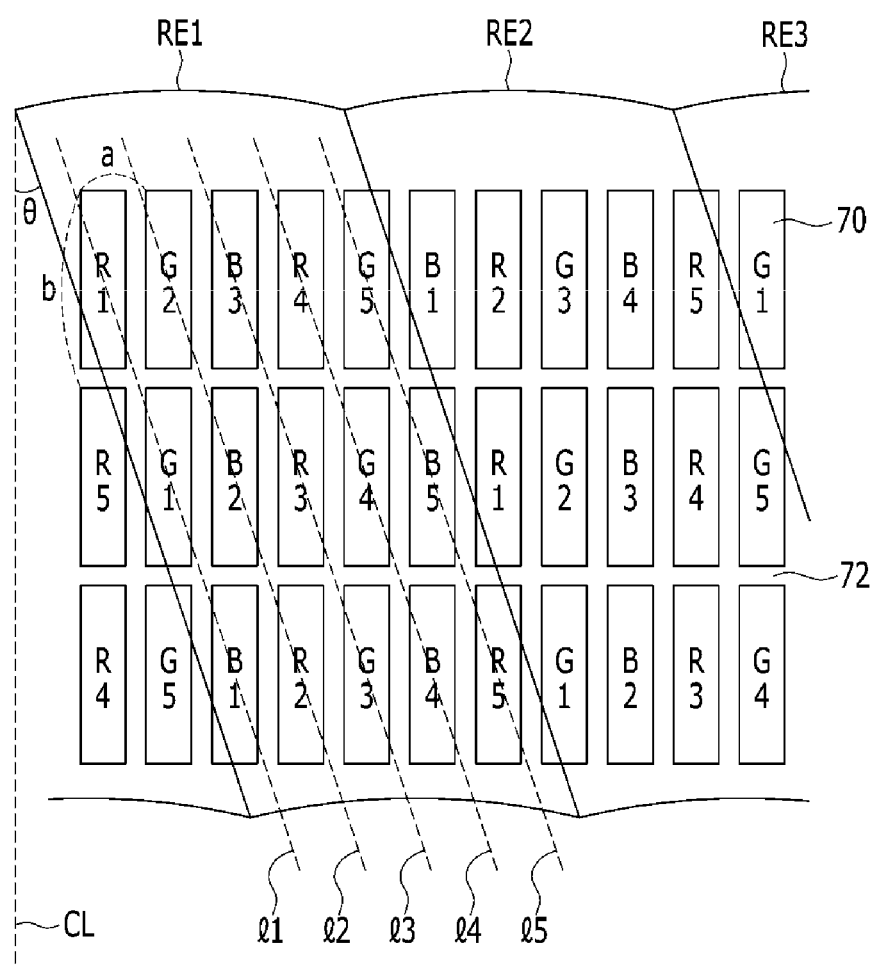
FIG. 4A to FIG. 4C are schematic representations each illustrating an example of an arrangement of an image display panel and a liquid crystal lens according to an embodiment of the present invention.

FIG. 4A is a schematic representation that illustrates the inclination angle θ of the lenticular lenses given that viewing points are arranged for each row of the subpixels. Referring to FIG. 4A, reference numeral 70 indicates a subpixel, and reference numeral 72 indicates a black matrix for preventing light transmission. As illustrated, in a case of five viewing points at each intersection of a subpixel row and a lenticular lens, the viewing points numbered 1-5 for each row are repeatedly positioned at the subpixels of R, G, and B and are sequentially repeated. The same-numbered viewing points in the adjacent rows are not disposed on the subpixels adjacent in the same column direction, but are positioned according to the adjacent column directions. Therefore, the straight lines passing the centers of the subpixels having the same viewing point numbers are parallel to each other and are inclined with respect to the column directions.

As illustrated in FIG. 4A, in the case of five viewing points, the imaginary straight line l1 passing centers of subpixels that correspond to viewing points 1, the imaginary straight line l2 passing centers of subpixels that correspond to viewing points 2, the imaginary straight line 13 passing centers of subpixels that correspond to viewing points 3, the imaginary straight line 14 passing centers of the subpixels that correspond to viewing points 4, and the imaginary straight line 15 passing centers of subpixels that correspond to viewing points 5 are parallel to each other and are disposed at the angle θ with respect to the imaginary column line CL (which extends in the subpixel column direction). Therefore, each of the lenticular lenses RE1-RE3 must include (or overlap) the imaginary straight lines 11-15 corresponding to five viewing points in a plan view of the display device. The straight line 13 is a lens axis of the lens RE1.

For the display device to display a 2D image when the liquid crystal lens 10 does not function as a lens that substantially refract light, the subpixels of R, G, and B may be repeatedly arranged in a same sequence for each row. For the display device to display a 3D image when the liquid crystal lens 10 functions as a lens that includes lenticular lenses, the sequential arrangement of the subpixels along each of the straight lines 11-15 (each being associated with respective same-numbered viewing points) may have an arrangement in which the subpixels of R, G, and B may be repeatedly arranged in a same sequence. For example, the straight line, which is associated with viewing points 1, may pass subpixels R, G, B, R, G, B, R, G, B, etc.

The inclination angle θ of each of the lenticular lenses RE1-RE3 of the liquid crystal lens 10 illustrated in FIG. 4A is $\tan^{-1} a/b$. Here, a and b are respectively a transverse length (or width in the row direction) and a longitudinal length (or length in the column direction) of each subpixel.

Figure 4B:
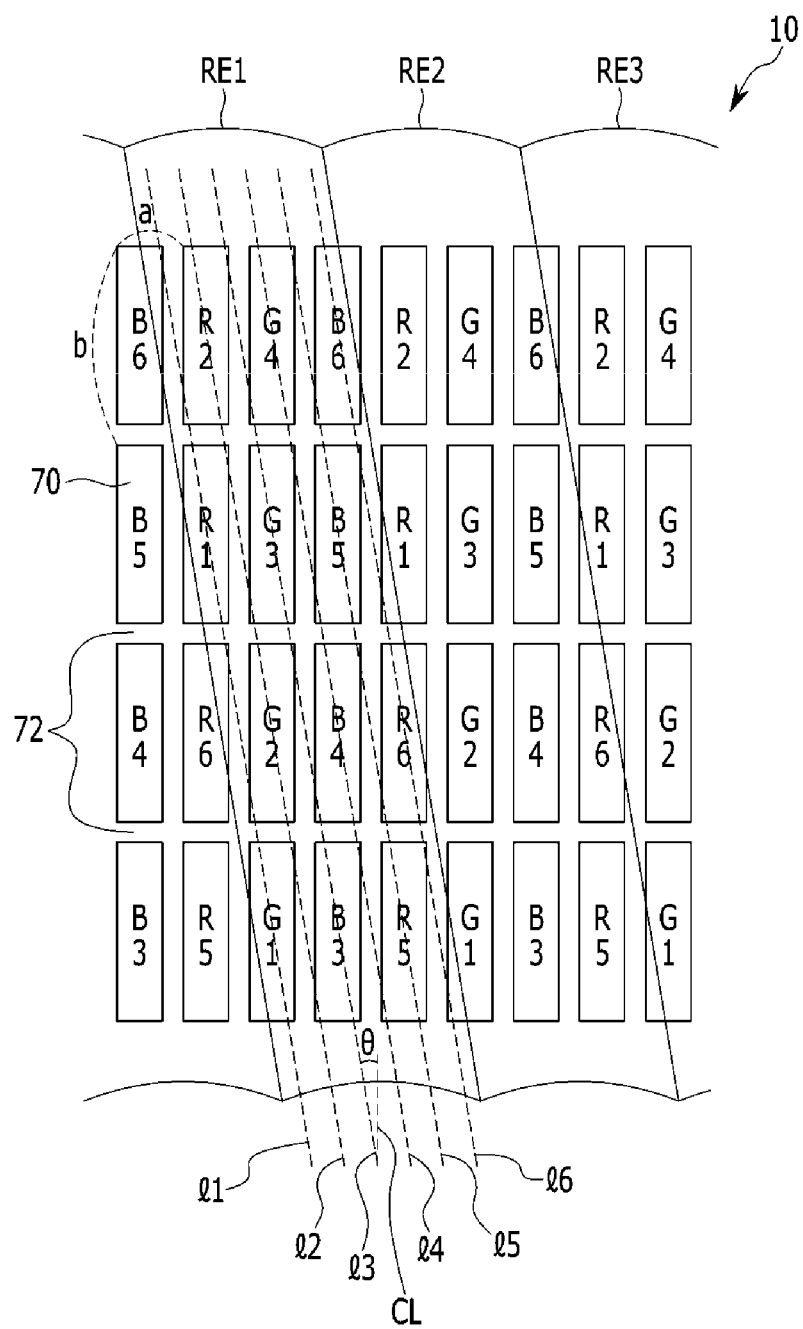

FIG. 4B is a schematic representation illustrating an inclination angle θ in an arrangement that has six viewing points corresponding to each intersection of a lenticular lens and two subpixel rows.

As illustrated in FIG. 4B, six imaginary straight lines 11-16 each passing centers of subpixels having same-numbered viewing points are positioned in (or overlap) each of the lenticular lenses RE1-RE3 of the liquid crystal lens 10. The six imaginary straight lines 11-16 respectively pass the centers of the R, G, and B subpixels and are parallel to each other. The subpixels of each row have the arrangement in which the R, G, and B subpixels are repeated in a same sequence. The imaginary straight lines 11-16 are respectively positioned at the inclination angle θ with respect to the imaginary columns line CL (which extends in the subpixel column direction). The inclination angle θ of each of the lenticular lenses RE1-RE3 of the liquid crystal lens illustrated in FIG. 4B is $\tan^{-1} a/2b$. Here, a and b are a transverse length and a longitudinal length of each subpixel, respectively.

Figure 4C:
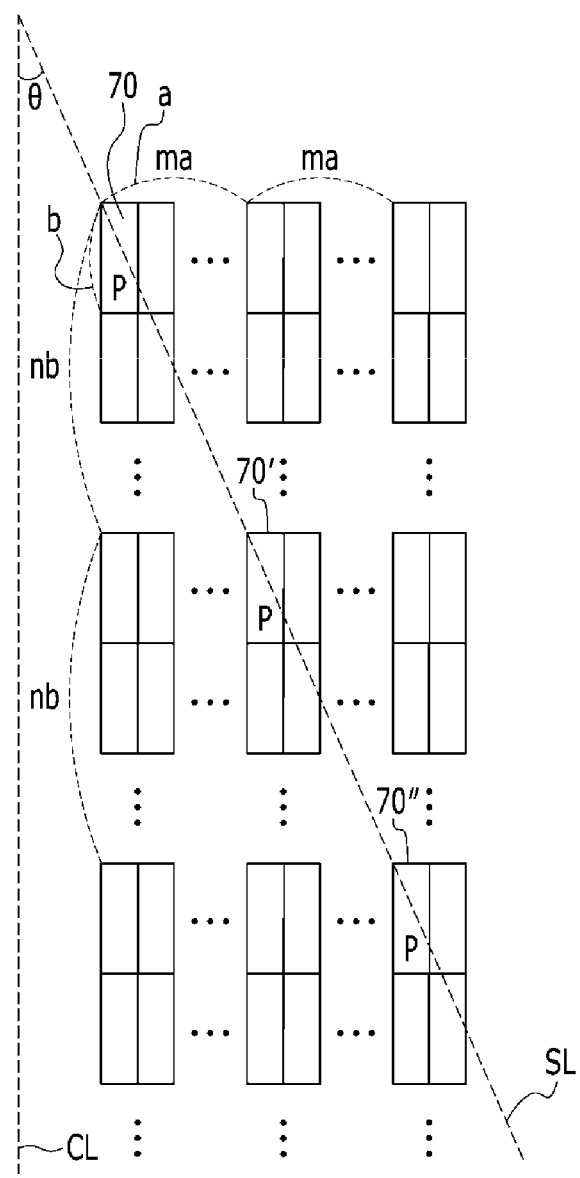

FIG. 4C is a schematic representation for illustrating induction of a general equation to determine the inclination angle θ. As illustrated, the angle between the imaginary straight lines SL passing the centers of subpixels 70, 70', and 70" having the same-numbered viewing points P and the imaginary column line CL extending in the column direction of the subpixels is the inclination angle θ. If the subpixels 70, 70', and 70" are repeatedly arranged in the n rows and the m columns, i.e., if the same-numbered viewing points P appears only once in every subpixel set that has n subpixel rows and m subpixel columns, the inclination angle θ may be calculated using Equation 2:

$$\theta = \tan^{-1} ma/nb \quad \text{(Equation 2)}$$

Here, a and b are respectively the transverse length (in the subpixel row direction) and the longitudinal length (in the subpixel column direction) of each subpixel.

For example, in FIG. 4A, a ratio of a and b is ⅓ if an aspect ratio of the display device is ⅓, and m=n=1. According to Equation 2, θ is about 18.5 degrees.

Figure 5:
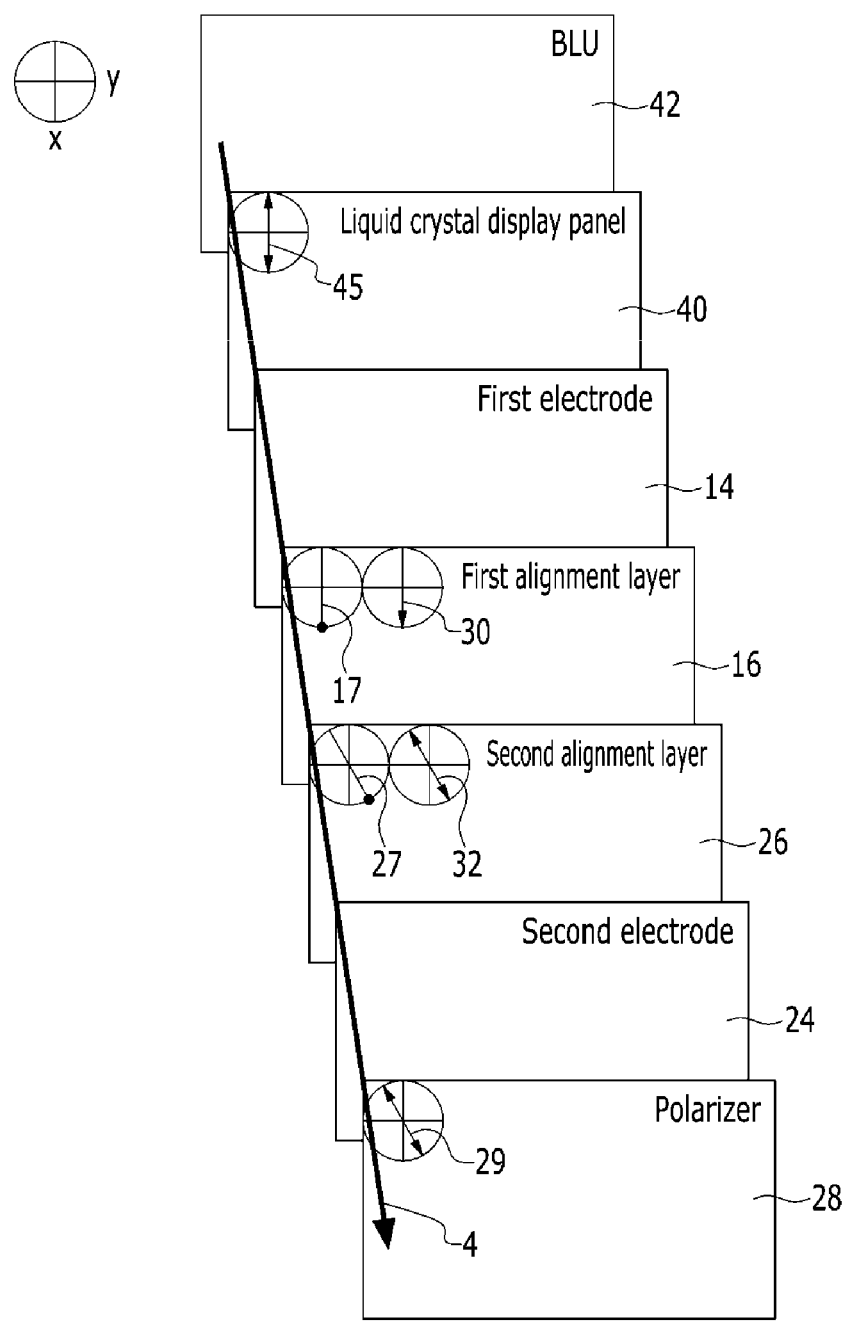
FIG. 5 is a schematic representation that illustrates a process in which light output from a 2D liquid crystal display panel is transmitted to a liquid crystal lens according to an embodiment of the present invention.

FIG. 5 is a schematic representation that illustrates a process in which light output from a 2D liquid crystal display panel is transmitted to a liquid crystal lens according to an embodiment of the present invention.

Referring to FIG. 5, the light irradiated from the backlight unit BLU 42 is polarized in the x direction parallel to a first polarization axis 45 and is transmitted through the 2D liquid crystal display panel 40 to the liquid crystal lens 10 (which may include elements 14, 16, 26, 24, and 28). The polarized light corresponds to the image displayed by the display panel 40. The reference numeral 4 in FIG. 5 represents a progressing direction of light.

The polarized light provided from the 2D liquid crystal display panel 40 is incident to the first alignment layer 16 (which is formed on the first electrode 14) as an incident light. The incident light is twisted by the predetermined inclination angle θ according to the alignment direction of the liquid crystal directors in the liquid crystal layer 18 to result in a twisted light. The twisted light is transmitted through the second alignment layer 26, the second electrode layer 24, and the polarizer 28 (which may have the second polarization axis 29 illustrated in FIG. 2. In FIG. 5, the reference numerals 17 and 27 respectively represent the arrangement direction (or alignment direction) of the liquid crystal directors adjacent to the first alignment layer 16 and the second alignment layer 26.

In one or more embodiments, the polarization direction of the polarized 2D image provided from the 2D liquid crystal display panel 40 is the same as the alignment direction of the first alignment layer 16. Therefore, the alignment direction of the first alignment layer 16 is the same as the polarization direction of the polarized 2D image provided from the 2D liquid crystal display panel 40, such that an additional polarizer or a λ/2 phase difference film is not required between the liquid crystal display panel 40 and the first alignment layer 16. In one or more embodiments, the liquid crystal lens 10 uses (and includes) only one polarizer 28 to correctly control the direction of the light transmitting through the liquid crystal lens 10.

A conventional liquid crystal lens of a 3D display device typically requires two polarizers and a λ/2 phase difference film, which may cause light leakage. In contrast, the display device 1 according to the present embodiment uses only one polarizer that is external to the liquid crystal display panel 40 and is included in the liquid crystal lens 10. Advantageously, light loss caused by the liquid crystal lens 10 may be minimized, and the luminance of the image may be maximized. In addition, the chiral dopant included in the liquid crystal layer 18 may advantageously maximize the transmittance of the liquid crystal lens 10.

The display device 1 may require a minimum number of polarizers included in the liquid crystal lens 10. Accordingly, the manufacturing process of the display device 1 may be simplified, and the thickness, weight, and cost of the display device 1 may be reduced. Advantageously, the thin 2D/3D switchable display device 1 may have a substantially light weight and may be manufactured with a low cost.

Figure 6A:
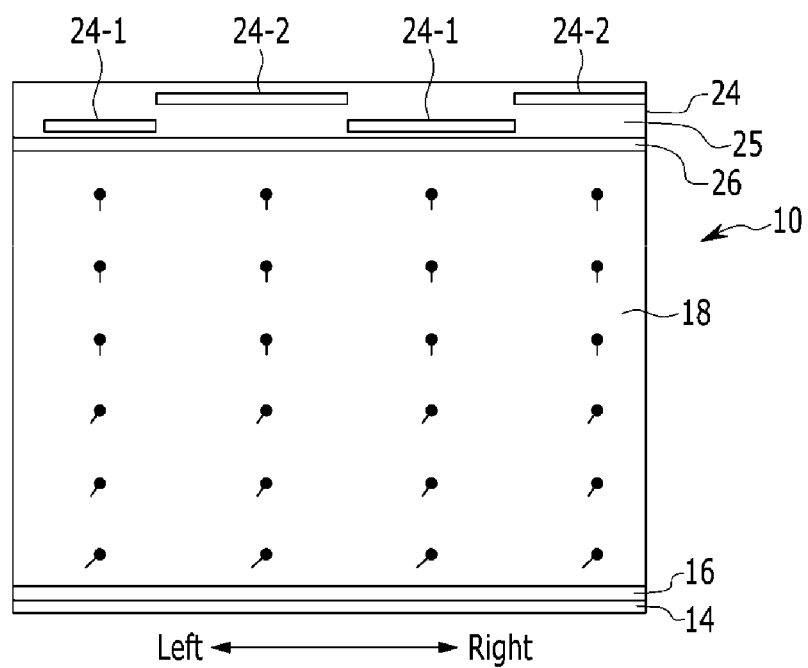
FIG. 6A and FIG. 6B are schematic representations for comparing configurations of a liquid crystal lens without and with a voltage being applied between electrodes of the liquid crystal lens according to an embodiment of the present invention.
Figure 6B:
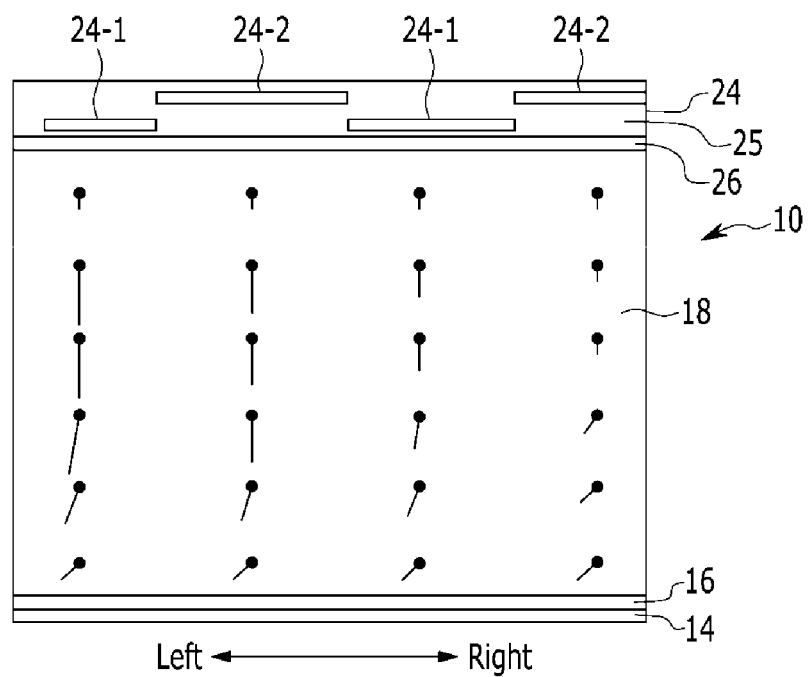

FIG. 6A and FIG. 6B are schematic representations illustrating a liquid crystal lens according to an embodiment of the present invention without and with a voltage being applied between electrode layers. FIG. 6A and FIG. 6B illustrate cross-sectional views of the liquid crystal lens 10 taken in a direction perpendicular to the y direction (illustrated in FIG. 2). As illustrated in FIG. 6A and FIG. 6B, the second electrode layer 24 may include a first electrode array 24-1 and a second electrode array 24-2.

FIG. 6A illustrates a 2D display mode in which the 2D/3D switchable display device 1 displays a 2D image in a state that no voltage is applied between the two electrode layers 14 and 24 of the liquid crystal lens 10. In absence of voltage, the liquid crystal directors of the liquid crystal layer 18 are maintained with an initial horizontal orientation.

Accordingly, the liquid crystal refractive index of the liquid crystal layer 18 has a constant value through the horizontal direction from the left side to the right side in FIG. 6A. Therefore, the light passing through the liquid crystal layer 18 is transmitted to the liquid crystal layer 18 without a substantial change of the progressing direction. In this case, the liquid crystal lens 10 functions like a light transmission member on the image display panel 40.

In contrast, FIG. 6B illustrates a 3D display mode in which the display device 1 displays a 3D image in state that a voltage is applied between the electrode layers 14 and 24 of the liquid crystal lens 10. FIG. 6B illustrates an example in which voltages are incrementally applied to the two electrode layers 14 and 24 from the right side to the left side. In one or more embodiments, the liquid crystal has positive dielectric anisotropy. Therefore, the liquid crystal directors adjacent to the alignment layers 16 and 26 maintain the initial alignment state. Nevertheless, the liquid crystal directors positioned at the center of the liquid crystal layer 18 stand increasingly closer to a vertical position from the right side to the left side of the liquid crystal layer 18, and the liquid crystal directors positioned at the leftmost side stand vertically. As a result, the liquid crystal refractive index is increased from the right side to the left side in the liquid crystal layer 18. Thus, the light passing through the liquid crystal layer 18 is refracted according to the difference of the liquid crystal refractive index. Therefore, the right portion having the smallest refractive index becomes the center portion of the liquid crystal lens and the left portion having the largest refractive index becomes the edge portion of the liquid crystal lens.

In one or more embodiments, the liquid crystal has negative dielectric anisotropy, and voltages are incrementally applied from the right side to the left side between the two electrodes 14 and 24. As a result, the right portion has the largest refractive index, thereby becoming the edge portion of the liquid crystal lens, and the left portion has the smallest refractive index, thereby becoming the center portion of the liquid crystal lens.

In FIG. 6A and FIG. 6B, the first electrode layer 14 is a common electrode layer. In the second electrode layer 24, the first electrode array 24-1 (which includes a first plurality of electrodes) and the second electrode array 24-2 (which includes a second plurality of electrodes) are formed in an insulation layer 25 with a portion of the insulating layer 25 interposed between the electrode arrays. In one or more embodiments, the first electrode layer 14 may include patterned conductive lines, and the second electrode layer 24 may be a common electrode.

In one or more embodiments, the first electrode array 24-1 and the second electrode array 24-2 are insulated by the insulating layer 25 and are arranged in a zigzag pattern. The first electrode array 24-1 may be misaligned with the second electrode array 24-2 such that electrodes of the first electrode array 24-1 may not overlap or may only partially overlap electrodes of the second electrode array 24-2 in a direction perpendicular to the alignment layer 26. In one or more embodiments, electrode edges of the first electrode arrays 24-1 may overlap electrode edges of the second electrode arrays 24-2, such that a plenty of conductive lines may be included in the second electrode layer 24. In one or more embodiments, the interval between the adjacent electrode lines may be substantially reduced. Since the number of electrode lines is increased, voltages applied may have more variety in the horizontal direction, and the liquid crystal refractive index of the desired lens type may be easily implemented.

Figure 7A:
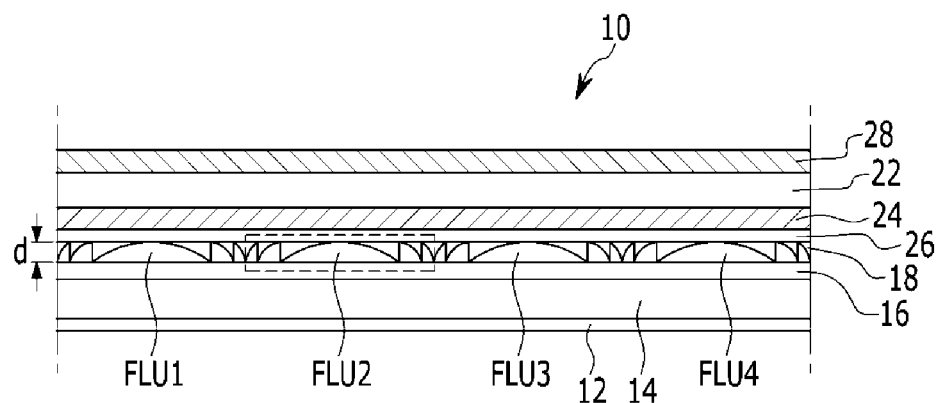
FIG. 7A to FIG. 7C illustrate views of a liquid crystal lens of a zone plate type according to an embodiment of the present invention.

FIG. 7A illustrates a view of a liquid crystal lens of a zone plate type according to an embodiment of the present invention. Fresnel lens units FLU1-FLU4 obliquely extends at the angle θ with respect to the columns line CL, analogous to the lens units RE1-RE3 described in FIG. 4A and FIG. 4B.

Referring to FIG. 7A, the liquid crystal lens 10 may be made of a zone plate type. The zone plate may be a Fresnel zone plate that realizes a lens effect using light diffraction.

In the 3D display mode, the voltage is applied to both electrode layers 14 and 24 of the liquid crystal lens 10 of the zone plate type such that a phase distribution in the liquid crystal layer 18 is formed of a Fresnel lens shape.

Figure 7B:
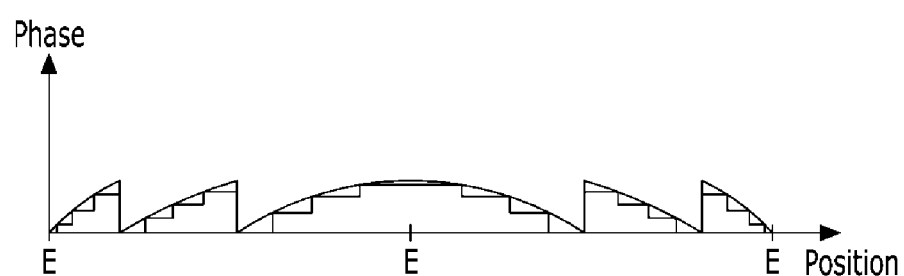
Figure 7C:
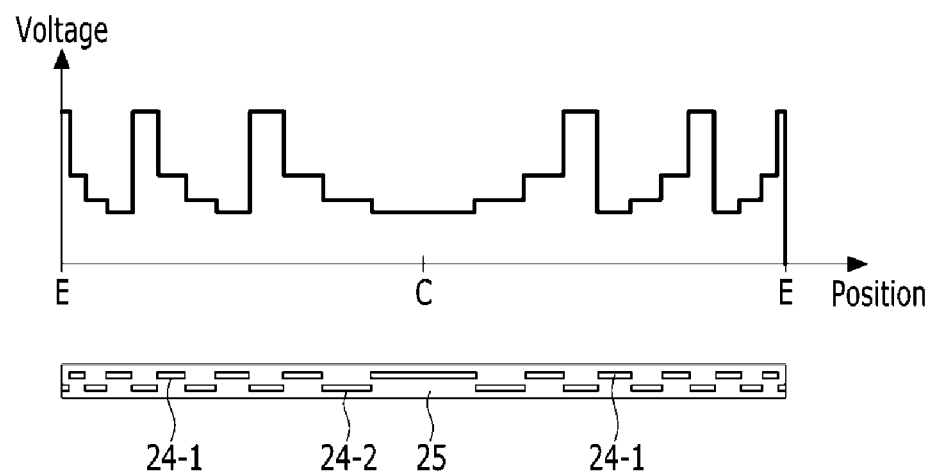

In FIG. 7A, a plurality of Fresnel lenses FLU1-FLU4 are disposed along the horizontal direction. FIG. 7B shows the phase distribution of one Fresnel lens among the Fresnel lenses FLU1-FLU4, and the phase distribution has the shape of the Fresnel lens. To form this Fresnel lens, the voltages applied to the first electrode array 24-1 and the second electrode array 24-2 of the second electrode layer 24 are illustrated in FIG. 7C. Meanwhile, the first electrode layer 14 is applied with the common voltage.

In one or more embodiments, the liquid crystal used in the liquid crystal layer 18 has positive dielectric anisotropy. Referring to FIG. 7B and FIG. 7C, if the voltage applied to the first electrode array 24-1 and the second electrode array 24-2 is high, the phase is decreased, and if the voltage applied to the conductive lines 24-1 and 24-2 is low, the phase is increased.

As illustrated in FIG. 7B, the light passing through the liquid crystal lens 10 of the zone plate type experiences different phase delays depending on horizontal positions. In addition, given diffraction, destructive interference, and constructive interference of the light in the liquid crystal lens 10, the observer recognizes the light corresponding to the different pixels according to the viewing angle of the observer.

In one or more embodiments, the liquid crystal lens 10 is of the zone plate type. Advantageously, a cell gap d of the liquid crystal layer 18 may be remarkably minimized to a thickness of 2-3 µm.

Figure 8:
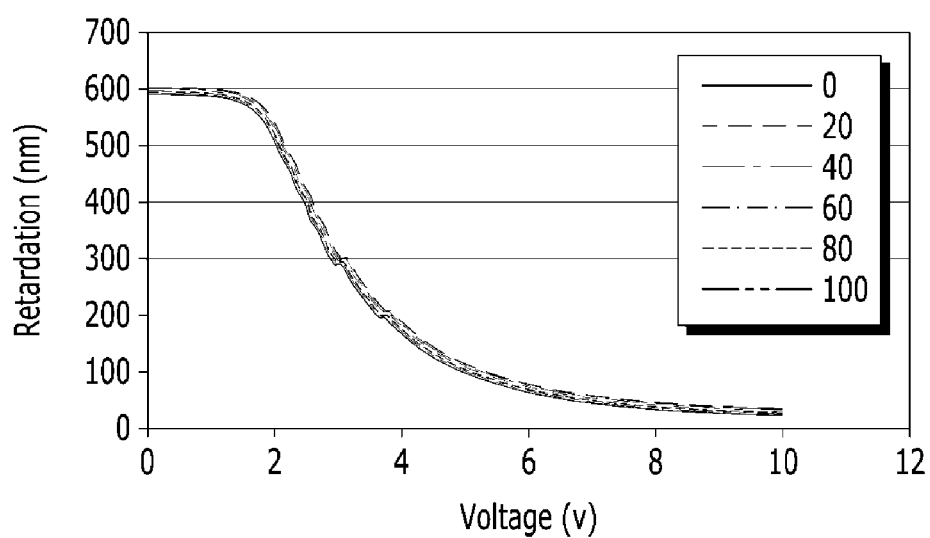
FIG. 8 is a graph that illustrates phase delay in relation to voltage in a liquid crystal lens according to an embodiment of the present invention.

FIG. 8 is a graph that illustrates phase delay (or retardation) in relation to a voltage in a liquid crystal lens according to an embodiment of the present invention.

In detail, FIG. 8 illustrates phase delay values corresponding to voltage values given different values of the pitch (in a unit of micrometers) of the chiral dopant mixed in the liquid crystal layer. In FIG. 8, a solid line corresponding to a pitch value of 0 is a state that no chiral dopant is added to the liquid crystal layer.

Referring to FIG. 8, regardless of the pitch of the chiral dopant mixed in the liquid crystal layer according to an embodiment of the present invention, the difference of the phase delay values corresponding to each voltage value is small. This result means that the change of the phase delay value corresponding to each voltage value is small although the chiral dopant is added to the liquid crystal layer. Therefore, the chiral dopant may be included in the liquid crystal layer to enhance transmittance without causing substantial changes to the phrase delay properties of the liquid crystal layer and without requiring changes to the method of applying voltage to the liquid crystal layer to form a desirable phase delay profile of the liquid crystal lens 10.

Figure 9A:
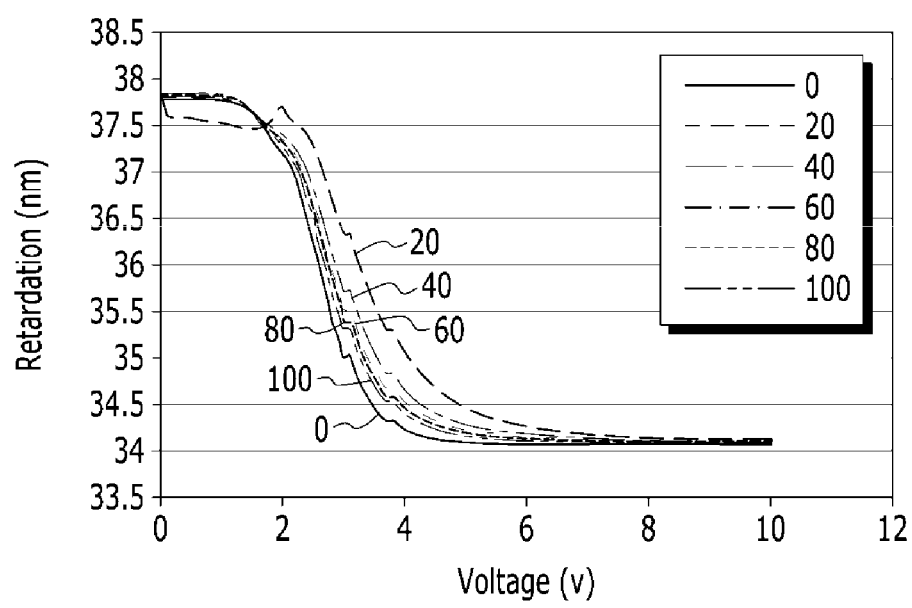
FIG. 9A and FIG. 9B are graphs that illustrate transmittance in relation to voltage in a liquid crystal lens according to an embodiment of the present invention.
Figure 9B:
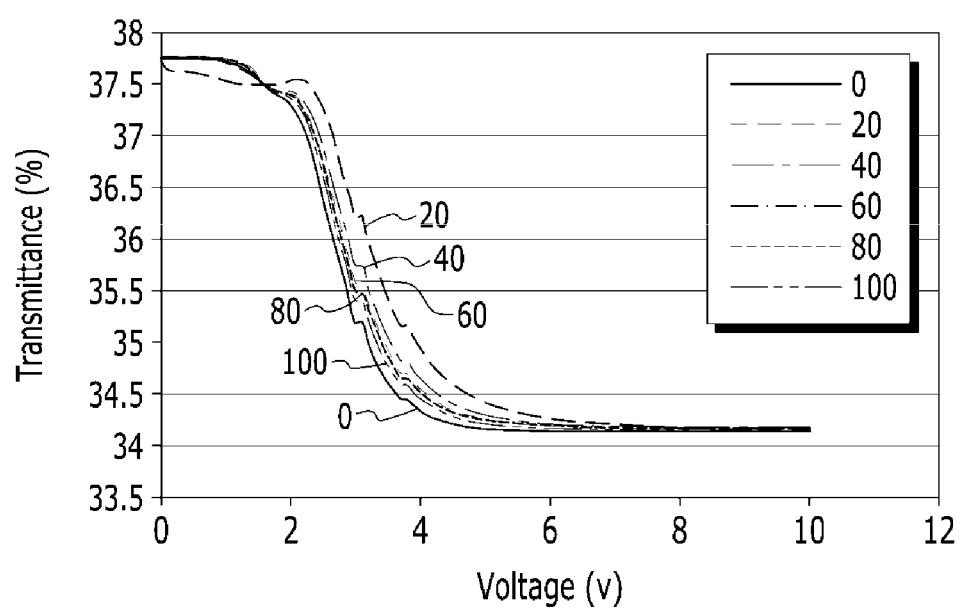

FIG. 9A and FIG. 9B are graphs that illustrate transmittance in relation to voltage in a liquid crystal lens according to an embodiment of the present invention. In detail, FIG. 9A and FIG. 9B illustrate transmittance values corresponding to voltage values given different values of the pitch (in a unit of micrometers) of the chiral dopant mixed in the liquid crystal layer. In each of FIG. 9A and FIG. 9B, a solid line corresponding to a pitch value of 0 is a state that no chiral dopant is added to the liquid crystal layer.

FIG. 9A illustrates simulation results of an embodiment wherein a value (a cell gap of the liquid crystal layer)*(a liquid crystal refractive index value)=d*n or (dn) is 0.2, while FIG. 9B illustrates simulation results of an embodiment herein (a cell gap of the liquid crystal layer)*(a liquid crystal refractive index value)=d*n or (dn) is 0.28.

Referring to FIG. 9A and FIG. 9B, if the pitch of the chiral dopant is decreased, the transmittance may increase given the same voltage that is in a range of about 2 V to about 8 V. A circular polarization effect may be increased by reducing the pitch according to the phase value corresponding to each voltage value such that the transmittance is increased, compared with the curve with 0 pitch value, which represents conventional art implementations with no chiral dopant. According to the examples of FIG. 9A and FIG. 9B, it is preferable that the pitch of the chiral dopant added to the liquid crystal layer is not too large. If the pitch of the chiral dopant is large, the transmittance may be undesirably low or the transmittance improvement may be very small such that there is no substantial transmittance improvement effect. Nevertheless, if the pitch of the chiral dopant is 20 μm, the transmittance may be distorted near the voltage value of 2 V. Accordingly, in one or more embodiments, the chiral dopant added to the liquid crystal material may have a pitch of more than 20 μm to less than 60 μm, to substantially improve the transmittance. A preferable range of the pitch of the chiral dopant will be described with reference to FIG. 10.

Figure 10:
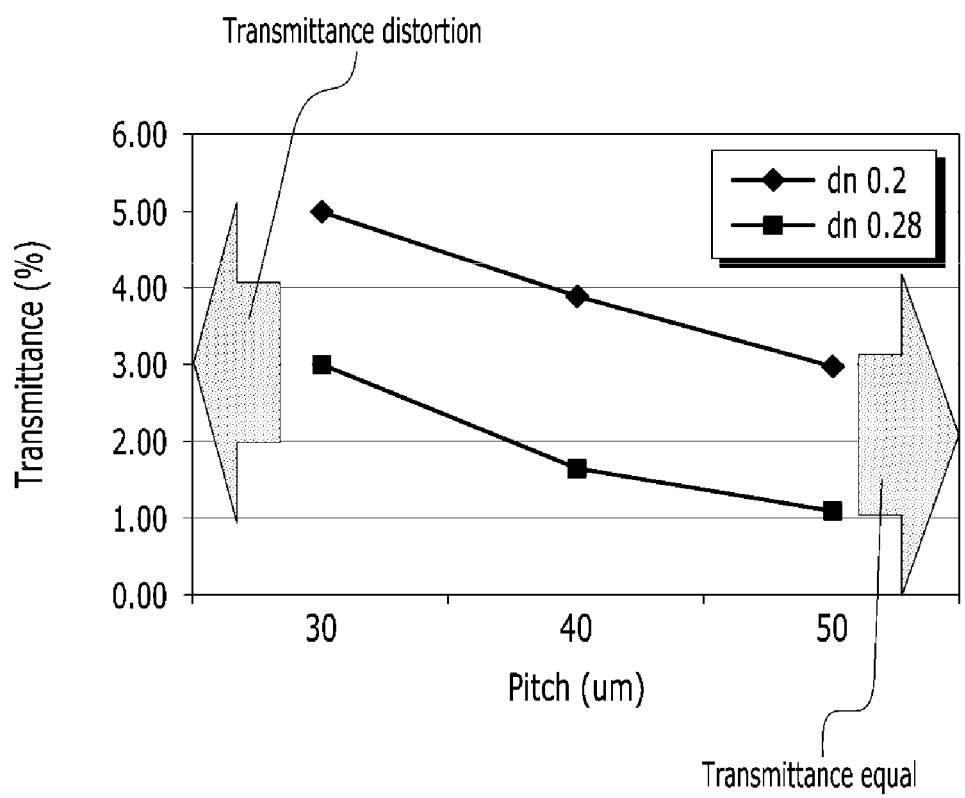
FIG. 10 is a graph that illustrates transmittance in relation to pitch of a chiral dopant in a liquid crystal lens according to an embodiment of the present invention.

FIG. 10 is a graph that illustrates transmittance in relation to pitch of a chiral dopant in a liquid crystal lens according to an embodiment of the present invention.

Referring to FIG. 10, if the pitch of the chiral dopant is reduced from about 50 μm to about 30 μm, the transmittance of the liquid crystal layer is increased. Nevertheless, a twist power may be very strong if the pitch is less than 30 μm, such that transmittance distortion may be generated. In addition, if the pitch of the chiral dopant is larger than 50 μm, the transmittance may be reduced. Accordingly, it is further preferable that the chiral dopant added to the liquid crystal material has a pitch that is equal to or more than 30 μm and is equal to or less than 50 μm, to substantially improve the transmittance.

Figure 11A:
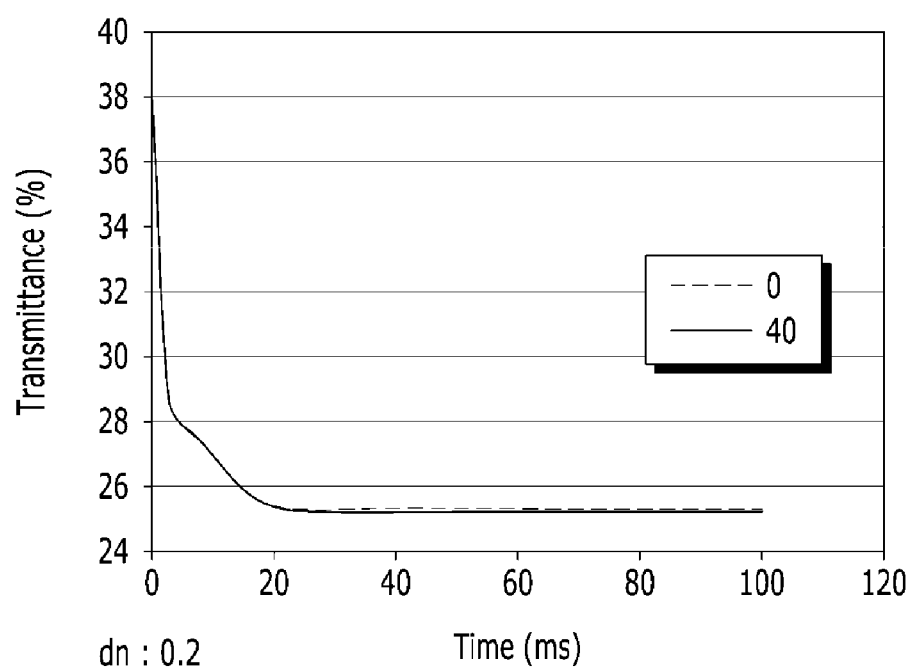
FIG. 11A and FIG. 11B are graphs that illustrate a response speed in a liquid crystal lens according to an embodiment of the present invention.
Figure 11B:
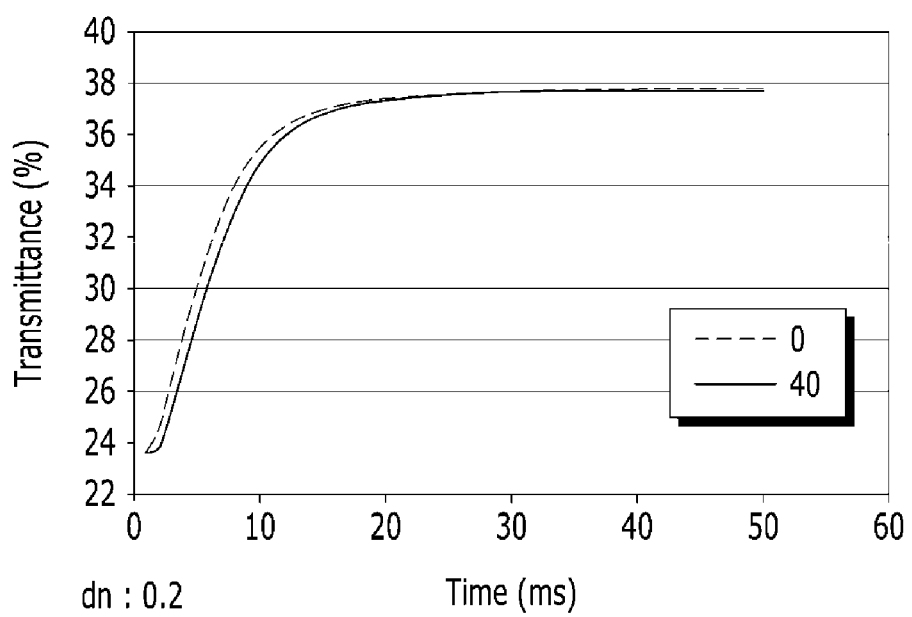

FIG. 11A and FIG. 11B are graphs that illustrate a response speed in a liquid crystal lens according to an embodiment of the present invention. In detail, FIG. 11A and FIG. 11B compare the response speed in a case that the pitch of the chiral dopant mixed in the liquid crystal layer is 40 μm with the response speed in a case that the liquid crystal layer does not include the chiral dopant, and (the cell gap)*(the liquid crystal refractive index value)=(dn) of the liquid crystal layer is 0.2.

FIG. 11A illustrates transmittance change in relation to time when applying a voltage is applied to the liquid crystal layer. FIG. 11B illustrates transmittance change in relation to time when the voltage is removed.

Referring to FIG. 11A, when the voltage is applied, although the chiral dopant of 40 μm is added, the response speed is not substantially affected. When the voltage is applied, the response speed is largely affected by the property of the liquid crystal such, and the effect of the chiral dopant may be negligible.

Referring to FIG. 11B, when the voltage is removed, given a same transmittance value, the chiral dopant may cause increase in response time. If the pitch of the chiral dopant is more than equal to or more than 30 μm and is equal to or less than 40 μm, the response speed is improved by 3 ms at a maximum. The twisted force of the chiral dopant due to the directivity is strong, and the released direction twisted liquid crystal is predetermined to increase an elastic energy such that the liquid crystal molecule is returned to the original state.

Figure 12A:
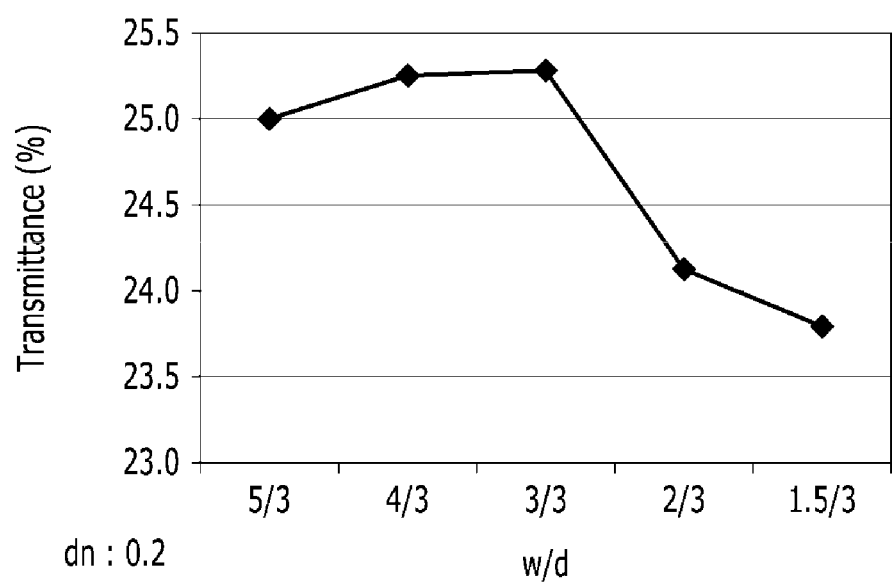
FIG. 12A and FIG. 12B are graphs that illustrate transmittance in relation to ratio of a width of an electrode and a cell gap ratio in a liquid crystal lens according to an embodiment of the present invention.
Figure 12B:
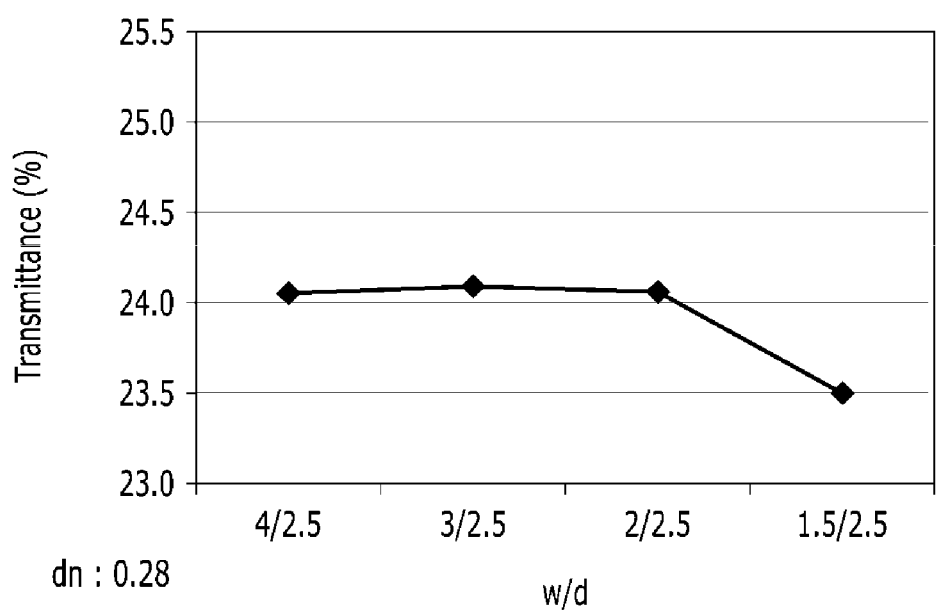

FIGS. 12A and 12B are graphs of transmittance in relation to a ratio of a width of an electrode and a cell gap in a liquid crystal lens according to an embodiment of the present invention. Here, the width of the electrode is the width of an electrode in the first electrode array 24-1 or in the second electrode array 24-2 illustrated in FIG. 6A and FIG. 6B. FIG. 12A illustrates transmittance values in relation to width-gap ratio values in the case that the value (dn) of (the cell gap)*(the liquid crystal refractive index of the liquid crystal layer) is 0.2. FIG. 12B illustrates transmittance values in relation to width-gap ratio values in the case that the value (dn) of (the cell gap)*(the liquid crystal refractive index of the liquid crystal layer) is 0.28.

Referring to FIG. 12A and FIG. 12B, if the ratio of the width of the electrode to the cell gap is less than 1, the transmittance is decreased. In the liquid crystal lens according to the present embodiment, to minimize the influence of a fringe field in the boundaries of the electrode, it is preferable that the width of the electrode is the same degree as the cell gap. In detail, if the ratio of the width of the electrode and the cell gap is less than 1, the transmittance is decreased by the fringe field, while if the ratio is larger than 2, the control force of the liquid crystal is decreased such that undesirable texture may be generated. Accordingly, it is preferable that the ratio of the width of the electrode to the cell gap is equal to or more than 1.0 and is equal to or less than 2.0.

While this invention has been described in connection with what is presently considered to be practical embodiments, it is to be understood that the invention is not limited to the disclosed embodiments. The invention is intended to cover various modifications and equivalent arrangements included within the spirit and scope of the appended claims.

| <Description of Symbols> | |
|---|---|
| 1: display device | 2: user |
| 10: liquid crystal lens | 12: first substrate |
| 14: first electrode layer | 16: first alignment layer |
| 18: lens liquid crystal layer | 22: second substrate |
| 24: second electrode layer | 26: second alignment layer |
| 28: polarizer | 30: first polarization axis direction |
| 32: second polarization axis direction | 40: display panel |
| 44, 46: substrate | 48: panel liquid crystal layer |
| 50, 52: polarizer | |

What is claimed is:

1. A display device comprising:
a first polarizer having a first polarization axis and configured to transmit first light that is parallel to the first polarization axis, wherein the first light pertains to a two-dimensional image;
a first electrode layer;
a second electrode layer overlapping the first electrode layer;
a liquid crystal layer disposed between the first electrode and the second electrode, the liquid crystal layer including a chiral dopant and a liquid crystal material, the liquid crystal layer being configured to form a lens that is associated with a predetermined phase distribution according to voltages applied to the first electrode layer and the second electrode layer, wherein the lens is configured for refracting the first light to transmit second light;
a second polarizer having a second polarization axis and configured for polarizing the second light to transmit third light that is parallel to the second polarization axis, wherein the second polarization axis is oriented at a first angle with respect to the first polarization axis in a plan view of the display device, and wherein the first angle has a predetermined angle size that is greater than zero degree; and
an image display panel that comprises a plurality of pixels arranged in a plurality of rows and a plurality of columns,
wherein each row of the plurality of rows has a row width,
wherein each column of the plurality of columns has a column width, and
wherein $\theta = \tan^{-1}(ma/nb)$
if $\theta$ represents the predetermined angle size, n and m represent natural numbers, a represents the column width, and b represents the row width.

2. The display device of claim 1, wherein a pitch of the chiral dopant is greater than 20 μm and is less than about 60 μm.

3. The display device of claim 1, further comprising:
a first alignment layer positioned on the first electrode layer and having an alignment direction parallel to the first polarization axis; and
a second alignment layer positioned on the second electrode layer and having an alignment direction oriented at a second angle with respect to the first polarization axis in the plan view of the display device, wherein the second angle has the predetermined angle size.

4. The display device of claim 3, wherein the alignment direction of the first alignment layer and the alignment direction of the second alignment layer are reversely-twisted by the predetermined angle size in the plan view of the display device.

5. The display device of claim 1, wherein a pitch of the chiral dopant is in a range of 30 μm to 50 μm.

6. The display device of claim 5, wherein the predetermined angle size is less than 90 degrees.

7. The display device of claim 1, wherein a lens axis of the lens formed by the liquid crystal layer is parallel to the second polarization axis.

8. The display device of claim 1, wherein the lens formed by the liquid crystal layer is configured to change a path of the first light according to an optical principle of a Fresnel zone plate.

9. The display device of claim 1, wherein one of the first electrode layer and the second electrode layer includes a first electrode array including a first plurality of electrodes, a second electrode array including a second plurality of electrodes, and an insulating layer disposed between the first electrode array and the second electrode array, and
wherein one of the first electrode layer and the second electrode layer includes a common electrode.

10. The display device of claim 9, wherein
each electrode of the first plurality of electrodes or each electrode of the second plurality of electrodes extends in a direction that is parallel to the second polarization axis.

11. The display device of claim 10, wherein
a ratio of a width of the first electrode or the second electrode to a cell gap of the liquid crystal layer is equal to or more than 1.0 and is equal to or less than 2.0.

12. The display device of claim 1, wherein
in a three-dimensional image display mode of the display device, a voltage is applied to at least one of the first electrode layer and the second electrode layer, and
in a two-dimensional image display mode of the display device, the voltage is turned off.

13. A liquid crystal lens mechanism for affecting display of an image provided by an image display panel, the image display panel comprising a plurality of pixels arranged in a plurality of rows and a plurality of columns, each row of the plurality of rows having a row width, each column of the plurality of columns having a column width, the liquid crystal lens mechanism comprising:
a first electrode layer;
a first alignment layer overlapping the first electrode layer, having a first alignment direction, and configured for aligning a first set of liquid crystal molecules in the first alignment direction;
a second electrode layer overlapping the first electrode layer;
a second alignment layer overlapping the second electrode layer, having a second alignment direction, and configured for aligning a second set of liquid crystal molecules in the second alignment direction, wherein the second alignment direction is at a first angle having a predetermined angle size with respect to the first alignment direction in a plan view of the liquid crystal lens mechanism, and wherein the predetermined angle size is greater than zero degree;
a liquid crystal layer disposed between the first alignment layer and the second alignment layer, the liquid crystal layer including the first set of liquid crystal molecules, the second set of liquid crystal molecules, and a chiral dopant; and
a polarizer overlapping the second electrode having a polarization axis that is oriented at a second angle with respect to the first alignment direction in the plan view of the liquid crystal lens mechanism, wherein the second angle has the predetermined angle size,
wherein $\theta = \tan'(ma/nb)$
if $\theta$ represents the predetermined angle size, n and m represent natural numbers, a represents the column width, and b represents the row width.

14. The liquid crystal lens mechanism of claim 13, wherein
an alignment direction of the first alignment layer and an alignment direction of the second alignment layer are reversely-twisted by the predetermined angle size.

15. The liquid crystal lens mechanism of claim 13, wherein
the predetermined the angle size is less than 90 degrees.

16. The liquid crystal lens mechanism of claim 13, wherein
- a lens axis of a liquid crystal lens formed by the liquid crystal layer is parallel to the polarization axis.

17. The liquid crystal lens mechanism of claim 13, wherein
- a liquid crystal lens formed by the liquid crystal layer is configured to a path of light according to an optical principle of a Fresnel zone plate.

18. The liquid crystal lens mechanism of claim 13, wherein
- one of the first electrode layer and the second electrode layer includes a first electrode array including a first plurality of electrodes, a second electrode array including a second plurality of electrodes, and an insulating layer disposed between the first electrode array and the second electrode array, and
- wherein one of the first electrode layer and the second electrode layer includes a common electrode.

19. The liquid crystal lens mechanism of claim 18, wherein
- each electrode of the first plurality of electrodes or each electrode of the second plurality of electrodes extends in a direction that is parallel to the polarization axis.

20. The liquid crystal lens mechanism of claim 13, wherein
- a pitch of the chiral dopant is more than 30 μm and is less than 50 μm.

* * * * *